(No Model.)
J. DUFFY.
SUPPORT FOR SPINNING SPINDLES.
No. 404,609. Patented June 4, 1889.
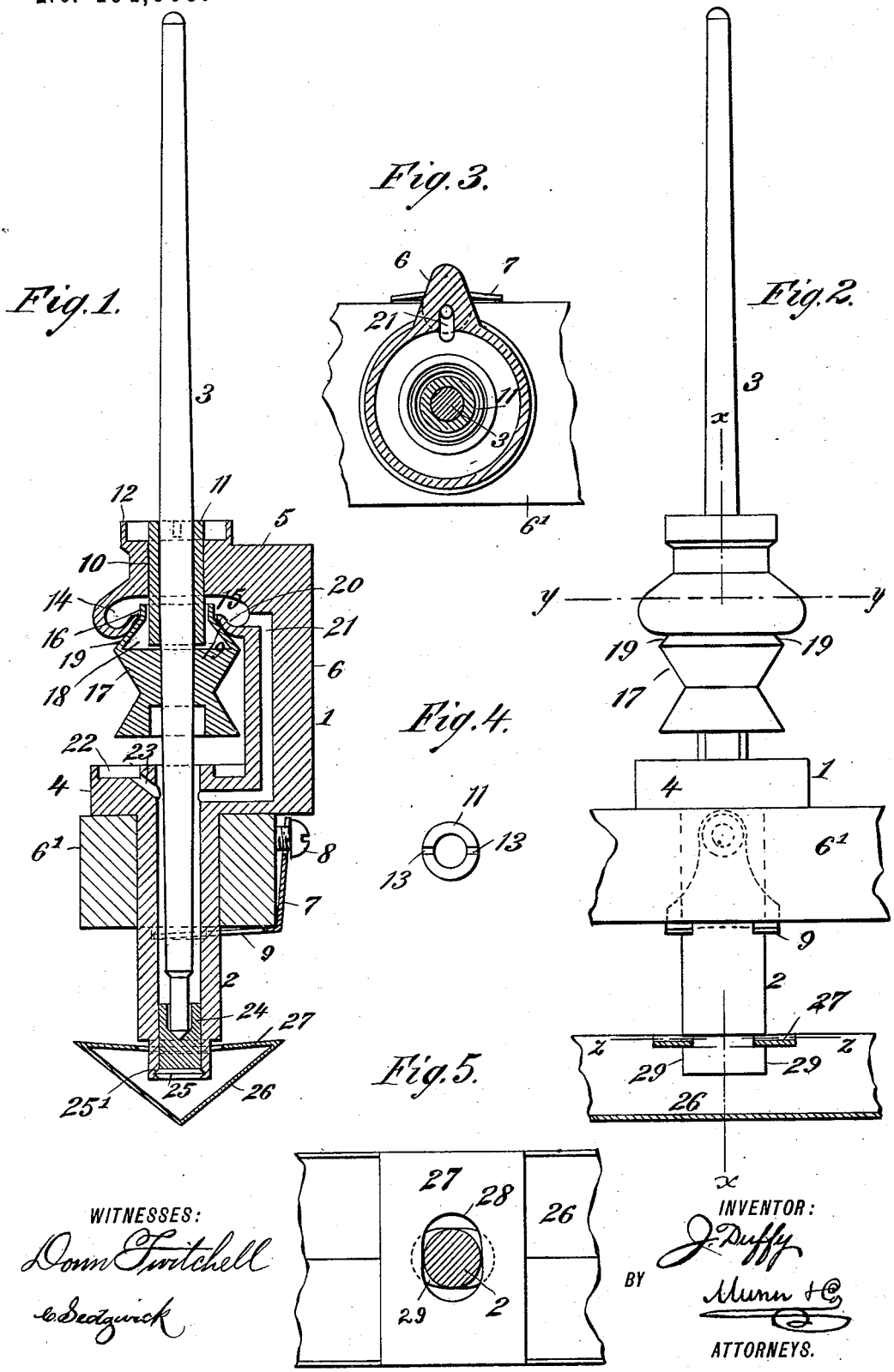
WITNESSES:
Donn Twitchell
C. Sedgwick
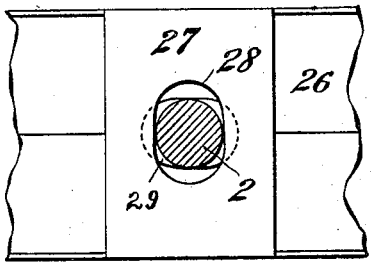
INVENTOR:
J. Duffy
BY Munn & Co.
ATTORNEYS.
N. PETERS. Photo-Lithographer, Washington, D. C.

UNITED STATES PATENT OFFICE.

JOSEPH DUFFY, OF PASSAIC, NEW JERSEY.

SUPPORT FOR SPINNING-SPINDLES.

SPECIFICATION forming part of Letters Patent No. 404,609, dated June 4, 1889.

Application filed January 24, 1889. Serial No. 297,406. (No model.)

*To all whom it may concern:*

Be it known that I, JOSEPH DUFFY, of Paterson, in the county of Passaic and State of New Jersey, have invented a new and Improved Support for Spinning-Spindles, of which the following is a full, clear, and exact description.

This invention relates to spindle-supports for spinning-machines, and has for its object to provide a spindle-support so constructed and arranged that the oil will not be thrown out by centrifugal force, but will be properly distributed to all the bearings of the spindle, and the spindle kept clean.

The invention also has for its object to provide a means by which the support may be held in place and readily detached, a means for supporting the lower end of the spindle and obtaining ready access thereto, and a receptacle for catching any oil-drip from the spindle.

The invention consists in a spindle-support and in details thereof, constructed and arranged as hereinafter described and claimed.

Reference is to be had to the accompanying drawings, forming a part of this specification, in which similar figures of reference indicate corresponding parts in all the views.

Figure 1 is a vertical section of the invention on the line $xx$ of Fig. 2. Fig. 2 is a view in elevation of the invention, showing the oil-trough in section. Fig. 3 is a horizontal section on the line $yy$, Fig. 2. Fig. 4 is a plan view of a tubular bearing for the spindle; and Fig. 5 is a horizontal section of the invention on the line $zz$, Fig. 2.

The support 1 is formed with the tubular socket portion 2 to receive the lower portion of the spindle 3, the horizontal arms 4 5 and the vertical portion 6 connecting the arms 4 5. The horizontal arm 4 of the support 1 rests on the rail 6', the tubular socket portion 2 projecting through an aperture in the rail 6'. The support 1 is held in position preferably by means of an L-shaped metallic spring-strip 7, secured at its upper end by a screw 8 to the rail 6' and having a forked lower end 9 engaging the projecting end of the tubular socket portion 2. The upper arm of the spring-strip 7 is extended at an incline to the lower arm, so that as the screw 8 is screwed up the upper spring-arm will be forced toward the rail by the screw and the forked end 9 will be forced down tightly against the tubular socket portion 2 and hold the same firmly.

The upper horizontal arm 5 of the support 1 is formed with an aperture 10, through which projects a tubular bearing 11 for the spindle 3, the upper end of the tubular bearing 11 projecting into an annular chamber 12 on the top of the arm 5 and forming an oil-chamber.

The upper end of tubular bearing 11, projecting into oil-chamber 12, is formed with radial grooves 13, to permit the passage of oil from the chamber 12 down between the spindle 1 and the tubular bearing 11.

Surrounding the lower end of the aperture 10 in arm 5 is an annular chamber 14, with a circular aperture 15 in its bottom, through which projects an annular neck 16 of a whirl 17, mounted on the spindle 3. The whirl 17 is formed with an annular chamber 18, having inclined sides 19 surmounted by the neck 16, the inclined sides 19 bearing against the upwardly-inclined annular portion 20, surrounding the aperture 15 in the bottom of chamber 14.

The lower end of the tubular bearing 11 projects through the center of chamber 14, the neck 16, and chamber 18 nearly to the bottom of the latter.

From one side of the chamber 14 an oil-passage 21 extends down through the vertical portion 6 and the lower arm 4 of the support 1 to the tubular socket 2.

Beneath the whirl 17 is located, in the top of horizontal arm 4, an annular oil-chamber 22, connecting, by means of an inclined oil-passage 23, with the tubular socket-chamber 2.

To provide a bearing or step for the lower end of the spindle 3 which will be oil-tight and may readily be removed from the tubular socket 2 when worn out and replaced, a socketed step or bearing plug 24 is employed, which is inserted in the lower end of the tubular socket 2 and held in place by solder 25 or other soft material, engaging a groove 25', and serving as a binder and forming an oil-tight joint, and which binder can be easily removed to permit the step 24 to be driven out of the tubular socket 2 by force applied above it.

In order to catch any oil-drip working down from the support, an oil-trough 26 is suspended beneath the bolster, preferably by means of a cross-strip 27 on the trough 26, having an oblong aperture 28 and projections 29 on the lower reduced end of tubular socket portion 2, over which the aperture 28 passes in one direction, and with which projections 29 the cross-strip 27 is locked upon turning the latter, so that the projections 29 engage its under side.

By means of the hereinbefore-described construction and arrangement of parts, in the revolution of the spindle 3 the oil will work down between the spindle and its tubular bearing or collar 11 into the chamber 18, which, owing to its inclined sides, contains securely the oil escaping from the collar 11. By this means the oil adhering to the sides of chamber 18 by centrifugal force will again return to the spindle and up the collar 11 when the spindle is at rest, giving it again the benefit of that oil which would otherwise be lost in whirls of ordinary construction. Should the chamber 18 become overcharged with oil, the latter will be carried by centrifugal force up out of the chamber 18 into the chamber 14, and out laterally therefrom through the passage 21 into the tubular socket 2. Any oil-drip there may be from the support will be caught in the trough 26. It will thus be seen that no oil will be thrown out from the spindle in its revolution by centrifugal force.

By means of the forked strip 7 and screw 8 the support will be securely held in position on the rail and may be readily removed therefrom.

Having thus described my invention, what I claim as new, and desire to secure by Letters Patent, is—

1. A spindle-support provided with a socket in its lower portion, an apertured oil-chamber in its upper portion, and an oil-passage leading from the chamber to the socket, in combination with a spindle fitting in the socket, and a whirl on the spindle and having its upper end projecting into the said chamber, substantially as herein shown and described.

2. The combination, with a spindle-support provided with a socket in its lower portion, an oil-chamber in its upper portion, with an opening in its bottom, and an oil-passage leading from the chamber to the socket, of a spindle seated in the socket, a chambered whirl on the spindle and having its upper end projecting into the oil-chamber, and a tubular bearing held in the support and projecting through the said oil-chamber into the chamber of the whirl, substantially as described.

3. The spindle-support 1, formed with the upper horizontal arm 5, the lower horizontal arm 4, the vertical portion 6, connecting arms 4 and 5, the depending tubular socket portion 2 to project through the rail, the annular oil-chamber 12 on the upper side of the arm 5, the annular oil-chamber 14 on the under side of arm 5, with opening 15 in its bottom surrounded by the upwardly-inclined annular portion 20, the opening 10, for the passage of the spindle connecting the oil-chambers 12 and 14, and the oil-passage 21, leading from the side of oil-chamber 14 down through the support to tubular socket portion 2, substantially as shown and described.

4. The spindle-support 1, formed with the upper horizontal arm 5, the lower horizontal arm 4, the vertical portion 6, connecting the arms 4 and 5, the depending tubular socket portion 2 to project through the rail, the annular oil-chamber 12 on the upper side of arm 5, the annular oil-chamber 14 on the under side of arm 5, with opening 15 in its bottom surrounded by the upwardly-inclined annular portion 20, the spindle-passage 10, connecting chambers 12 and 14, and the oil-passage 21, leading from the side of oil-chamber 14 down through the support to tubular socket portion 2, in combination with the spindle 3, having its lower end mounted in the tubular socket portion 2, the whirl 17, with the oil-chamber 18 in its upper portion having inclined sides 19 bearing against the upwardly-inclined portion 20 of chamber 14, and the neck 16, projecting through opening 15 in the latter, and the tubular spindle-bearing 11, extending through passage 10, with its upper end having oil-passages 13 opening into chamber 12 and its lower end projecting into chamber 18, substantially as shown and described.

5. The combination, with the rail 6', of the spindle and support, the latter having a tubular socket portion 2 projecting through the rail, and a lock consisting of the L-shaped metallic spring-strip 7, with an inclined arm secured by a detachable fastening to rail 6', and having the fork-shaped end 9 engaging the tubular socket portion 2, substantially as shown and described.

6. The combination, with the spindle and support, the latter having a tubular socket portion 2 projecting through the rail, with projections 29 on its lower end, of a trough 26, with a cross-strap 27, having an oblong aperture 28, with which the tubular socket portion 2 engages, substantially as shown and described.

7. A spindle-support having the tubular socket portion 2, to project through the rail and receive the lower end of the spindle, and a socketed spindle-bearing plug 24, inserted in the end of tubular socket 2 and secured by a solder filling 25, substantially as shown and described.

JOSEPH DUFFY.

Witnesses:
ROBERT J. RISK,
CHARLES WHITING.